Patented Dec. 3, 1940

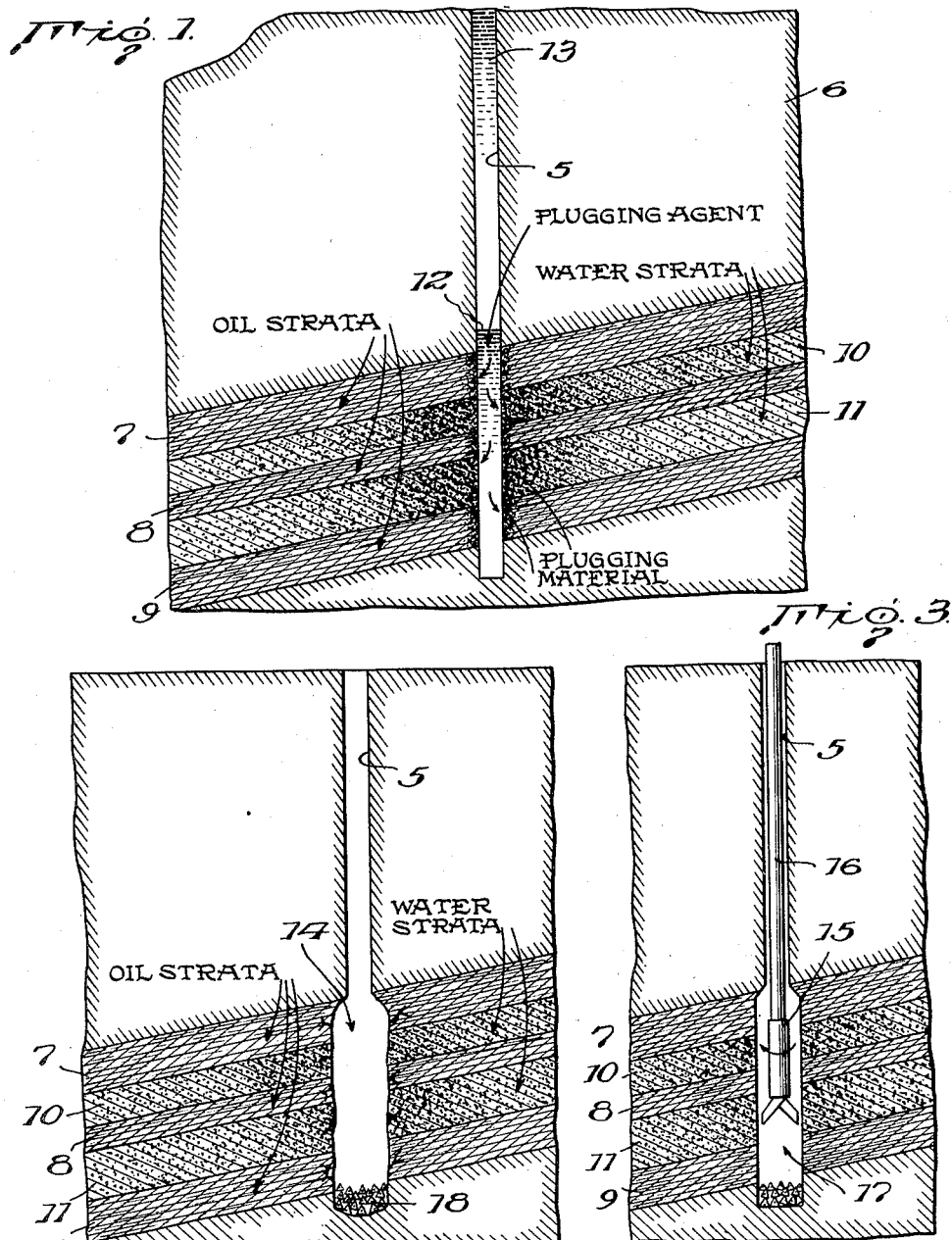

2,223,804

UNITED STATES PATENT OFFICE 2,223,804

METHOD OF SEALING PERVIOUS STRATA IN OIL OR GAS WELLS

Harvey T. Kennedy, Oakmont, Pa., assignor to Gulf Research & Development Company, Pittsburgh, Pa., a corporation of Delaware Application November 4, 1938, Serial No. 238,892

4 Claims. (Cl. 166—21)

This invention or discovery relates to methods of sealing pervious strata in oil or gas wells; and it comprises a method of selectively shutting off the more permeable rock formations or portions thereof in oil wells while leaving the less permeable portions free to produce, including the steps of injecting into the well and surrounding formations an agent of such character as to penetrate into the formations to a depth depending on the permeability thereof and to form a sealing plug therein, and removing or otherwise rendering ineffective the plug in the region immediately surrounding the bore walls while leaving the more permeable parts of the formations plugged; all as more fully hereinafter set forth and as claimed.

One object of the invention is the provision of a method of sealing off highly pervious or permeable rock strata or sands in oil or gas wells, and in particular pervious strata containing flowing water, without obstructing less pervious strata through which oil and gas enter the well. Another object is the provision of a process of shutting off water in oil wells in which the depths, the relative positions and the thicknesses of the oil and water bearing layers need not be taken into account in carrying out the method. Another object is the provision of such a process capable of utilizing any of a wide variety of water shutoff agents, the necessity of selection of agents with regard to inertness to oil being obviated. These and other objects appearing below, are achieved in the invention.

Leakage of water into oil or gas wells from surrounding pervious (permeable) rock strata is a source of great waste in the oil production art, and many methods have been proposed for shutting off the water flows without affecting the oil flows. The most commonly used methods involve cementing or running an extra string or casing or both, and such methods leave much to be desired as regards simplicity and effectiveness. Recently, shutoff methods have been developed involving the injection into the pores of the wet strata of a fluid of such character as to form an insoluble plug in the pores of the strata. While such procedures are attractive in principle, many of them have proved to be erratic and uncertain in practice. They have the serious disadvantage that the valuable oil or gas sand is quite apt to be plugged along with the water sand.

Many wells produce substantially pure oil when first completed, but in the course of time begin to produce a substantial proportion of water. It is found that in such cases the water is entering the well through strata, streaks or crevices of high permeability, and because of the high permeability, and of the low viscosity of water as compared with oil, the well may eventually produce mostly water, even though large quantities of oil still remain in adjoining, less permeable strata. Conventional water shutoff procedures have not proved generally satisfactory for treating such conditions, because they usually cause more or less plugging of the oil sand. This is true even when care is taken to use an agent which is precipitated only by water and is inert to (pure) oil. The reason even such "selective" agents plug the oil sands more or less is that oil sands often contain some water.

My invention is particularly adapted for application to water-leakage conditions of this character and is based on the discovery that when a material to plug these formations is injected it follows these streaks of high permeability and travels in these streaks a much greater distance from the well than it does in the regions of low permeability. If a pay sand has been treated in this manner, therefore, the loose streaks are rendered impermeable for relatively greater distances from the well, whereas the denser, less permeable strata may contain plugging material for only a few inches or feet from the well. According to the invention, I inject into the well indiscriminately (that is, without taking precautions to confine the injection to any particular stratum) a plugging agent of such character as to enter the pores and crevices of the rock. The plugging agent need not be of the so-called selective type; it can be anything which will flow a substantial distance through rock pores and crevices and form a dislodgement-resisting plug therein. The agent goes farther into the more pervious or permeable rock than into the less permeable (oil-producing) rock. After allowing time for the plug to harden or otherwise become immobilized, I remove the plugging agent from the rock immediately surrounding the bore, that is, immediately behind the bore walls. This is conveniently done by blasting off the face of the bore walls, as with a limited charge of nitroglycerine, or by dissolving out the plugged rock in the vicinity of the bore, or by mechanically reaming out the bore to remove the bore walls with their contained seal. The debris is removed, and production resumed. The oil sands are thereby substantially completely unsealed, and are left free to produce, while the water sands are left effectively plugged because most of the plug is in portions of the rock remote from the well face and therefore unaffected by the localized blast, reaming, etc.

In carrying out my invention, the well to be treated is advantageously first cleaned out by means of a bailer to remove sand and scale or other solid material, and then treated with any of the well-known processes for complete plugging, such as plugging with a gelling material like silicon tetrachloride (Kennedy and Lawton Patent 2,019,908), methyl silicate, or mixtures of sodium silicate and hydrochloric acid. Or there may be injected a thin Portland cement grout or similar hardening material, as a thin fluent suspension capable of entering at least the larger pores and crevices. Such an agent is independent of the presence of water in the interstices of the rock. Or if the permeable strata are wet (as is usually the case), there may be employed a material adapted to precipitate in the pores, such as antimony trichloride, an alcoholic suspension of bentonite, or other water-precipitable material, forced into the formation by the application of suitable pressure. The agent may be injected in vapor form; e. g. heated naphthalene vapor. After allowing sufficient time for the plugging material to precipitate or to harden, as the case may be, the well is treated to remove the plugged portions of the dense strata, for example, by localized shooting with a quantity of explosive, such as nitro-glycerine or gelatin dynamite, to shatter the formation to a sufficient distance from the well to remove the plug from the fine-pored portion of the formation containing oil, but not sufficient to destroy the loose formation containing plugging material a substantial distance from the well.

In the accompanying drawing there is shown in a schematic or diagrammatic manner one mode of carrying out the invention.

In the drawing:

Fig. 1 is a vertical section through the earth showing an oil well extending through permeable producing rock formations, during the plugging agent injection step, Fig. 2 is a view corresponding to Fig. 1 showing the aspect of the well after removal of the plugged rock at the well face, and Fig. 3 is a view illustrating use of an under-reamer in removing plugged rock from the well walls.

Referring to the drawing, Fig. 1 shows an oil well 5 extending down through the earth 6 into a pay region comprising three oil-bearing strata 7, 8 and 9 and two intervening water-bearing strata 10 and 11. The water bearing strata are relatively coarse-pored compared to the oil strata. According to the invention there is first introduced into the well a charge 12 of a suitable liquid plugging agent such as methyl silicate as described, and pressure is applied by a liquid column 13 to force the plugging agent into the rock. The plugging agent enters all the exposed rock strata to distances dependent upon the permeability of the rock, and, in solidifying, plugs the pores. The plugging of the rock is indicated by dots in the figure, which shows that the more permeable rock 10 and 11 is plugged to a much greater distance away from the well face than is the less permeable rock 7, 8 and 9. Pressure is retained a sufficient time for the plugging agent to harden and solidify in the pores of the rock and then liquids are removed from the well as by bailing. At this stage the whole producing region is sealed tight and the well does not produce.

In the next step a limited charge of explosive (not shown) is introduced into the portion of the well adjacent the several formations described and is fired in a known way, shattering the rock for a short distance away from the well face and leaving an enlarged cavity 14. The plugged portions of the oil sands are thereby removed, leaving these sands free to produce, while the water sands remain effectively sealed as the blast does not affect the remoter regions of the rock. The well is ready to resume production after the shattered rock, indicated at 18, has been removed in a known way by bailing or flushing (not shown).

The aspect of the lower portion of the well is similar in the case where the rock near the well face is disintegrated by a limited acid charge. Referring to Fig. 3: in case under-reaming is employed to remove the plugged rock near the well face, a conventional under-reamer 15 is introduced into the well on a drill pipe 16 and is operated to scrape off the rock near the well face leaving a cylindrical cavity 17 as shown.

In a specific example illustrative of the mode of carrying out my invention, 500 gallons of a mixture of 50 per cent methyl silicate and 50 per cent water, together with 0.1 per cent hydrochloric acid as an accelerator, is injected into the exposed formation of a well under pressure. After allowing 24 hours for the chemical to harden, the well is shot with 20 quarts of nitroglycerine in a way known per se, the shot extending through the entire height of the permeable formation into which the chemical is injected. The well is then cleaned out by bailing or flushing the loose sand and shattered rock from the well and put back on regular production. The oil production is increased due to enlarging the hole and opening up the oil-bearing strata which have relatively small penetration of chemical, whereas the water production which was coming entirely through porous streaks in the formation is shut off.

Water which enters the well immediately after the well is drilled does not as a rule enter through loose streaks. Although in some instances my process is effective in treating this type of water intrusion, it is particularly adapted to the treatment of wells where the water encroachment and entry takes place some time after the well has been completed and put on production, the delayed entry of water being reliable evidence that the water is encroaching through porous streaks rather than being adjacent to the well when the well was drilled. The invention is also applicable to treatment of input wells for water flooding procedures, where a similar situation occurs during the later stages of flooding when water begins to bypass through more permeable strata.

Another method of disintegrating the formation adjacent to the well after the plugging process, is to mechanically remove the part of the formation adjacent the well by means of under-reaming or other mechanical means. In some cases the plugged bore walls can be removed chemically, as by putting into the well a limited charge of hydrochloric acid or other reagent adapted to disintegrate or dissolve the plug or the rock or both, the effective range of action of the reagent being limited by employing only a small charge, and avoiding heavy injection pressures. Thus in employing acid to disintegrate the face of the well bore, one or more bailerfuls of inhibited acid, e. g. inhibited HCl, can be lowered into the well and left to react for a suitable length of time. In general, my invention includes plugging strata in which the loose streaks are penetrated by the plugging agent for a greater distance than the less permeable parts of the formation, and subsequently removing or otherwise rendering ineffective the plugging action in the less permeable formations immediately adjacent to the well.

An important feature of my invention is the fact that it is unnecessary to locate the horizons producing water and oil, a process which is often tedious and uncertain. Further, the combination of total plugging and subsequent removal of plugged formation in the tighter horizons is in effect a selective water-plugging process, accomplished by means of non-selective chemicals.

My process may be applied to any well in which undesirable or extraneous fluid is produced through the looser streaks as, for example, water coming through loose streaks in oil or gas wells, or gas coming through similar streaks into oil wells in cases where no market exists for gas.

What I claim is:

1. A method of selectively shutting off extraneous fluids from producing oil wells in exposed permeable formations which are producing substantial amounts of extraneous fluid along with the oil, which comprises the steps of injecting into the well and formations a fluent sealing agent which penetrates into permeable rock and forms a dislodgment-resisting sealing plug therein, and after the plugging has taken place, disintegrating the exposed faces of the plugged rock whereby flow of oil into the well is re-established while influx of the extraneous fluid is suppressed.

2. A method of selectively shutting off water from oil and gas wells in permeable formations, at a stage in production when such wells have begun to produce substantial amounts of water along with the oil and gas, which comprises the steps of injecting into the well under pressure a fluent sealing agent which penetrates into the pores and crevices of permeable rock and forms a sealing plug therein of a character resisting dislodgment under formation pressures, and after the plug has formed firing in the well a charge of explosive in amount sufficient to shatter the plugged rock immediately surrounding the well face, whereby flow of oil or gas into the well is re-established while water influx is suppressed.

3. A method of selectively shutting off water from oil and gas wells in permeable formations, at a stage in production when such wells have begun to produce substantial amounts of water along with the oil or gas, which comprises the steps of injecting into the well and formations under pressure a fluent sealing agent which penetrates into the pores and crevices of permeable rock and forms a sealing plug therein of a character resisting dislodgment under formation pressures, and after the plug has formed reaming out the well in the producing region thereof to a larger diameter whereby flow of oil into the well is re-established and water influx is suppressed.

4. A method of selectively shutting off water from oil and gas wells in permeable formations, at a stage in production when such wells have begun to produce substantial amounts of water along with the oil or gas, which comprises the steps of injecting into the well and formations under pressure a fluent sealing agent which penetrates into the pores and crevices of permeable rock and forms a sealing plug therein of a character resisting dislodgment under formation pressures, and after the plug has formed treating the producing region with a charge of acid sufficient to disintegrate the portion of the plugged rock immediately behind the well face whereby flow of oil into the well is re-established and water influx is suppressed.

HARVEY T. KENNEDY.